(12) United States Patent
Chauhan et al.

(10) Patent No.: US 11,816,023 B1
(45) Date of Patent: Nov. 14, 2023

(54) TEST CONFLICT GUARD FOR PARALLEL SOFTWARE TESTING

(71) Applicant: State Farm Mutual Automobile Insurance Company, Bloomington, IL (US)

(72) Inventors: Shaktiraj Chauhan, Normal, IL (US); Nate Shepherd, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 77 days.

(21) Appl. No.: 17/333,989

(22) Filed: May 28, 2021

Related U.S. Application Data

(60) Provisional application No. 63/152,781, filed on Feb. 23, 2021.

(51) Int. Cl.
    *G06F 11/36* (2006.01)
    *G06F 8/41* (2018.01)
    *G06F 8/70* (2018.01)

(52) U.S. Cl.
    CPC ............ *G06F 11/3688* (2013.01); *G06F 8/44* (2013.01); *G06F 8/70* (2013.01); *G06F 11/3684* (2013.01)

(58) Field of Classification Search
    CPC .... G06F 11/3688; G06F 11/3684; G06F 8/40; G06F 8/70
    See application file for complete search history.

(56) References Cited

U.S. PATENT DOCUMENTS

| | | |
|---|---|---|
| 6,330,528 B1 | 12/2001 | Huang et al. |
| 7,178,063 B1 | 2/2007 | Smith |
| 7,506,312 B1 | 3/2009 | Girolami-Rose et al. |
| 8,281,187 B1 | 10/2012 | Desai et al. |
| 8,549,522 B1 | 10/2013 | Chatterjee et al. |
| 9,009,823 B1 | 4/2015 | Ismael et al. |
| 9,032,373 B1 | 5/2015 | Gupta et al. |
| 10,067,858 B2 | 9/2018 | McDonald |
| 10,430,319 B1 | 10/2019 | Tokappa et al. |
| 10,628,394 B1 | 4/2020 | Gurspan |
| 2002/0116507 A1 | 8/2002 | Manjure et al. |
| 2003/0208351 A1 | 11/2003 | Hartman et al. |
| 2005/0120276 A1 | 6/2005 | Kolawa et al. |
| 2005/0251719 A1* | 11/2005 | Gerber ................ G06F 11/3696 714/742 |

(Continued)

OTHER PUBLICATIONS

Office Action for U.S. Appl. No. 17/333,637, dated Jun. 15, 2022, Chauhan "Retrying Failed Test Cases in Software Testing Using Parallel Threads", 18 pages.

(Continued)

*Primary Examiner* — Qing Chen
*Assistant Examiner* — Amir Soltanzadeh
(74) *Attorney, Agent, or Firm* — Lee & Hayes, P.C.

(57) ABSTRACT

In association with unit and integration testing of a software application, a test conflict guard can detect whether test cases are independent and use distinct database data, or are related or dependent test cases that use the same database data. The test conflict guard can detect any related or dependent test cases in a group of test cases, which may cause testing errors if executed in different parallel threads. The test conflict guard can accordingly block test execution until the group of test cases are verified as independent test cases.

20 Claims, 5 Drawing Sheets

(56) References Cited

U.S. PATENT DOCUMENTS

| | | |
|---|---|---|
| 2006/0212412 A1 | 9/2006 | Sapir |
| 2007/0271483 A1 | 11/2007 | Kolawa et al. |
| 2009/0144706 A1* | 6/2009 | Pastorelli ............... G06F 9/466 717/127 |
| 2009/0259699 A1 | 10/2009 | Chasman et al. |
| 2009/0307763 A1 | 12/2009 | Rawlins et al. |
| 2010/0100871 A1* | 4/2010 | Celeskey ............ G06F 11/3688 717/124 |
| 2011/0246540 A1 | 10/2011 | Salman et al. |
| 2012/0023373 A1 | 1/2012 | Chen |
| 2012/0151455 A1 | 6/2012 | Tsantilis et al. |
| 2016/0026562 A1 | 1/2016 | Hwang et al. |
| 2017/0109257 A1 | 4/2017 | Li |
| 2018/0113798 A1 | 4/2018 | Johnston et al. |
| 2018/0113799 A1 | 4/2018 | M.V. et al. |
| 2018/0173606 A1 | 6/2018 | Malla et al. |
| 2019/0087311 A1 | 3/2019 | Donaldson et al. |
| 2019/0129833 A1 | 5/2019 | Lv et al. |
| 2019/0332523 A1 | 10/2019 | Gefen et al. |
| 2020/0065235 A1* | 2/2020 | Li ....................... G06F 11/3692 |
| 2020/0174907 A1 | 6/2020 | Lundquist et al. |
| 2020/0210170 A1* | 7/2020 | Johnson ................ H04L 9/3239 |
| 2020/0310860 A1 | 10/2020 | Arumugam et al. |
| 2020/0349062 A1* | 11/2020 | Coleman ............ G06F 11/3688 |
| 2021/0109848 A1* | 4/2021 | Leon .................. G06F 11/3688 |
| 2021/0286710 A1* | 9/2021 | Hicks .................. G06F 11/3676 |
| 2023/0090033 A1 | 3/2023 | Chauhan |

OTHER PUBLICATIONS

Office Action for U.S. Appl. No. 17/333,535, dated Jun. 20, 2022, Chauhan, "Software Testing in Parallel Threads With a Record-Locking Database", 6 pages.

Office Action for U.S. Appl. No. 17/333,739, dated Aug. 4, 2022, Chauhan, "Software Testing in Parallel With Different Database Instances", 12 pages.

DisGiuseppe, "Automatically Describing Software Faults". Proceedings of the 2013 9th Joint Metting on the Foundations of Software Engineering, 2013, 4 pgs.

Haftmann, et al., "Parellel Execution of Test Runs for Database Application Systems" Proceedings of the 31st VLDB Conference, 2005, 12 pgs.

Office Action for U.S. Appl. No. 17/333,739, dated Jan. 12, 2023, Chauhan, "Software Testing in Parallel With Different Database Instances", 12 pages.

Office Action for U.S. Appl. No. 17/333,894, dated Jan. 6, 2023, Chauhan, "Parallel Software Testing Based on Annotations", 18 pages.

Office Action for U.S. Appl. No. 17/333,637, dated Dec. 20, 2022, Chauhan, "Retrying Failed Test Cases in Software Testing Using Parallel Threads", 22 Pages.

Qusef, "Recovering test-to-code traceability using slicing and textual analysis", Journal of Systems and Software 88 2014, pp. 147-168.

* cited by examiner

TEST CONFLICT GUARD FOR PARALLEL SOFTWARE TESTING

RELATED APPLICATIONS

This U.S. Patent Application claims priority to provisional U.S. Patent Application No. 63/152,781, entitled "TEST CONFLICT GUARD FOR PARALLEL SOFTWARE TESTING," filed on Feb. 23, 2021, the entirety of which is incorporated herein by reference.

TECHNICAL FIELD

The present disclosure relates to performing unit and integration testing during software development, particularly with respect to avoiding the creation of dependent and/or related test cases that may cause testing errors when executed in parallel.

BACKGROUND

During development of a software application, software developers can prepare tests to verify that the software application operates as expected. Such tests may be associated with unit testing that evaluates the functionality of a relatively small piece of code, and/or integration testing that evaluates how multiple pieces of code interact. Because individual tests may be designed to test one or more relatively small aspects of the overall software application, software developers may create numerous tests associated with the entire software application.

In some situations, when a new version of the software application is tested, it can take a relatively long period of time to execute all of the tests and verify that the new version of the software application successfully passes all of the tests. As a non-limiting example, tests for a software application may be written in a set of 7000 class files that each include numerous functions, and it may take up to two hours to sequentially execute all of the tests in the 7000 class files.

The time it takes to sequentially execute a large set of tests can pose challenges and introduce delays during software development, particularly in situations in which multiple developers are working on the same software application. As an example, a team of software developers may generate sixty new builds of the software application in a single day. If each build is tested using a set of 7000 class files that takes up to 120 minutes of server time to execute, the testing may take up to 7200 minutes of server time in a single day.

As another example, two developers may check out code from a main code branch and independently make changes to the code for the software application. If the first developer submits updated code for testing, it may take two hours to run a set of test cases on the first developer's updated code. However, by the time the testing verifies that the first developer's changes have passed the set of test cases and can be incorporated back into the main code branch, the second developer may separately have submitted different code changes for testing. The code changes made by the second developer may be incompatible with the changes made by the first developer. Accordingly, even if the second developer's changes also independently pass the set of test cases, it may not be possible to incorporate those changes back into the main code branch due to incompatible changes already made by the first developer. If testing of the first developer's code changes had been performed more quickly, the second developer could have been made aware of the first developer's changes and accounted for them before the second developer submitted additional code changes for testing.

Accordingly, it can be desirable to execute tests on updated code for a software application more quickly than described above. One possibility for speeding up the testing process is to run different tests in parallel at the same time. For example, rather than running tests within a set of 7000 class files in sequence, the tests can be divided into smaller sets that can be run simultaneously in two or more parallel threads. Although executing the set of tests in sequence may take up to two hours, running different subsets of the tests simultaneously in parallel threads may allow the set of tests to complete in 30 minutes or less. Developers can thus be notified whether their code changes pass the set of tests more quickly, and allow code changes that have passed the set of tests to be merged into a main code branch more quickly. In addition to executing tests more quickly for a single new build of a software application, running tests in parallel threads can also reduce overall usage of server time when multiple new builds of the software application are tested. For instance, if testing each build of a software application takes up to 120 minutes when tests are executed sequentially in a single thread, it can take up to 7200 minutes of server time to test sixty different builds in a day. If running the tests in parallel reduces the testing time for each build down to 30 minutes as discussed above, testing sixty builds in a day may take only 1800 minutes of server time. However, although parallelization can speed up testing of a software application, in some cases the parallelization itself can cause errors and/or failed tests during testing. In particular, parallelization may lead to database errors or other testing errors if tests are designed to build on one another and/or use the same database data, and such related or dependent tests are executed in different parallel threads instead of sequentially in the same threads.

As an example, related tests may attempt to access the same table of a database. The database may be configured to at least briefly lock the table when the table is accessed by a code element, such that the database table cannot be changed by other code elements while the table is locked. If a set of tests are run sequentially in an intended order, a first test may have finished accessing a database table, and the table can thus be unlocked, by the time a second test later attempts to access the database table. The second test may succeed in this scenario due to the unlocked database table. However, if the tests are instead run in parallel as described above, there is a chance that different tests, executing simultaneously in different parallel threads, may attempt to access the same database table at essentially the same time. This can cause database conflicts, table locking errors, and/or failure of one or more of the tests. For instance, if a database table is locked due to a first test accessing the database table, the table may still be locked if a second test, executing in parallel with the first test, also attempts to access the database table. The database table locking can thus cause the second test to fail, even though the second test may have succeeded if it had been executed at a different time when the database table was not locked due to another test executing in parallel.

As another example, tests may be written such that a first test creates data in a database, and a second test accesses or edits the data that the first test created. If these two tests are executed in sequence, the first test can have successfully created the data in the database by the time the second test attempts to access that data in the database. However, if the tests are instead run in parallel, there is a chance that the second test will execute in a parallel thread earlier than the first test executes in another parallel thread. Accordingly, if the second test executes earlier than the first test due to parallelization, the second test may fail because database data used in the second test has not yet been created by the first test.

The example systems and methods described herein may be directed toward mitigating or overcoming one or more of the deficiencies described above.

SUMMARY

Described herein are systems and methods for testing a software application using a set of independent test cases distributed among different test sets executed in different parallel threads. In particular, a test conflict guard can verify that the test cases within a set of test cases are independent test cases that use distinct data in a database, before permitting a test manager to distribute the independent test cases among different test sets to be executed in parallel. If the test conflict guard instead determines that any of the test cases are dependent and/or related test cases that use the same data in the database, the test conflict guard may block the test manager from distributing the test cases among different test sets and/or executing the test sets in parallel. By ensuring that the test cases distributed among different test sets executed in parallel are independent test cases that do not use the same database data, database and other testing errors that may occur when executing dependent or related test cases in different parallel threads can be avoided. Additionally, executing the independent test cases in parallel, instead of in sequence, can reduce testing times and reduce usages of computing resources.

According to a first aspect, a computer-implemented method can include identifying, by one or more processors of a computing device, a plurality of test cases associated with a software application. The method can also include determining, by the one or more processors, that the plurality of test cases includes at least two related test cases configured to use common data in a database, and blocking, by the one or more processors, execution of the plurality of test cases based on determining that the plurality of test cases includes the at least two related test cases. The method can further include determining, by one or more processors based on changes to the plurality of test cases, that the plurality of test cases includes independent test cases configured to use distinct data in the database and that the plurality of test cases does not include the at least two related test cases. The method can also include unblocking, by the one or more processors, execution of the plurality of test cases based on determining that the plurality of test cases include independent test cases and does not include the at least two related test cases. The method can also include distributing, by the one or more processors, individual test cases of the plurality of test cases among a plurality of test sets, and executing, by the one or more processors, the plurality of test sets in parallel.

According to a second aspect, a computing device can include one or more processors and memory storing computer-executable instructions that, when executed by the one or more processors, cause the one or more computing devices to perform operations. The operations can include identifying a plurality of test cases associated with a software application. The operations can also include executing a test conflict guard. The test conflict guard can be configured to block execution of the plurality of test cases based on a first determination that at least some of the plurality of test cases are related test cases configured to use common data in a database. The test conflict guard can also be configured to permit execution of the plurality of test cases based on a second determination that the plurality of test cases includes independent test cases configured to use distinct data in the database and does not include the related test cases. The operations can also include executing a test manager. The test manager can be configured to, in response to the second determination of the test conflict guard, distribute individual test cases of the plurality of test cases among a plurality of test sets, and cause execution of the plurality of test sets in parallel.

According to a third aspect, one or more non-transitory computer-readable media can store computer-executable instructions that, when executed by one or more processors, cause the one or more processors to perform operations. The operations can include identifying a plurality of test cases associated with a software application, wherein the plurality of test cases comprises at least one draft test case generated via a programming tool. The operations can also include determining that the plurality of test cases includes at least two related test cases configured to use common data in a database, and causing the programming tool to display a warning message identifying the at least two related test cases. The operations can further include determining, based on changes to the plurality of test cases received in response to the warning message, that the plurality of test cases includes independent test cases configured to use distinct data in the database and does not include the at least two related test cases. The operations can also include distributing, in response to determining that the plurality of test cases includes independent test cases and does not include the at least two related test cases, individual test cases of the plurality of test cases among a plurality of test sets, and executing the plurality of test sets in parallel.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
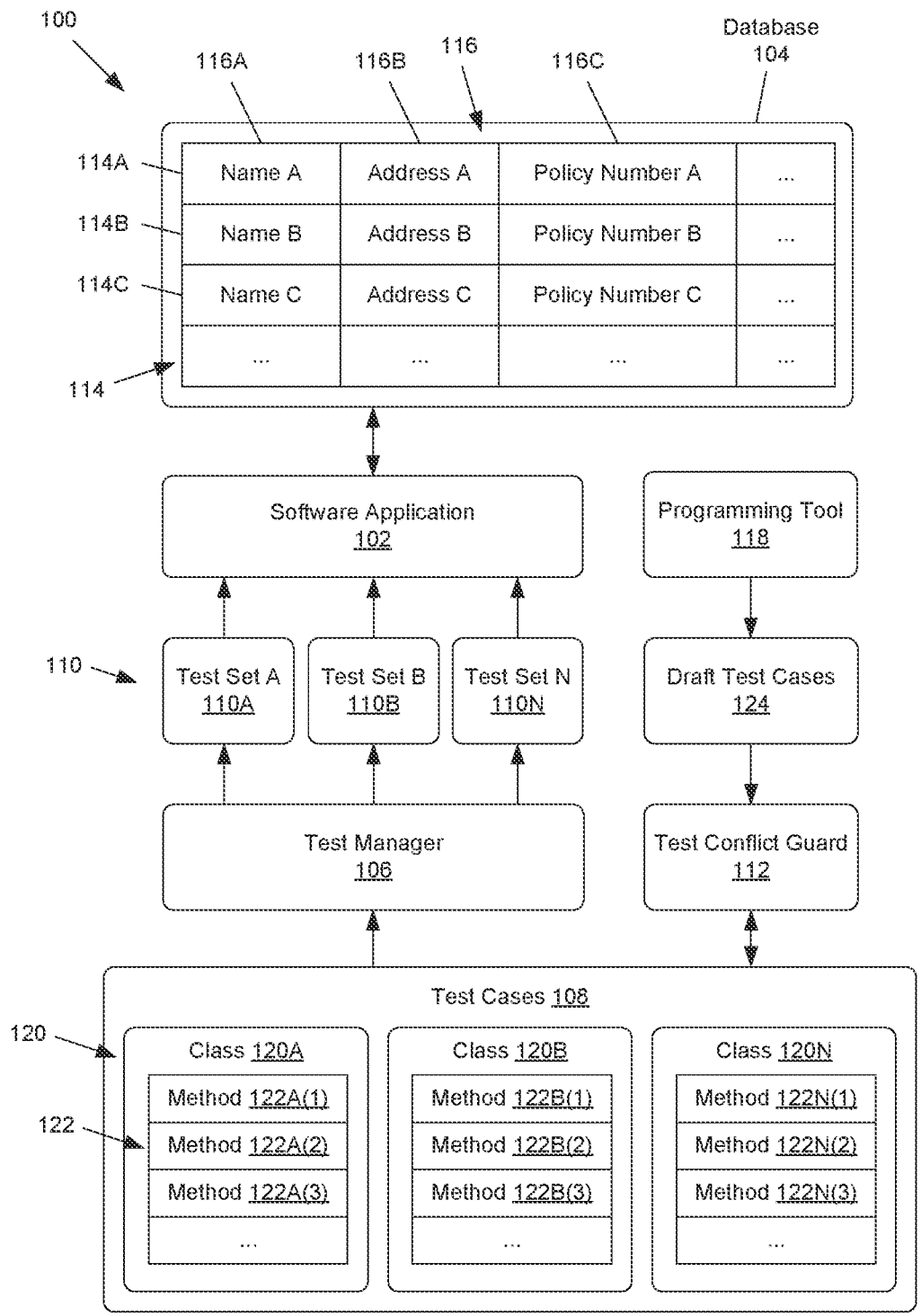
FIG. 1 shows an example of a system for testing a software application that operates in association with a database.

FIG. 1 shows an example of a system 100 for testing a software application 102 that operates in association with a database 104. In particular, the system 100 can include a test manager 106 that distributes code for a set of test cases 108 among different test sets 110 associated with different parallel threads on a computing device. The test manager 106 can cause the test cases 108 in the test sets 110 to execute, substantially simultaneously, in the parallel threads on the computing device in association with one or more instances of the software application 102. Accordingly, executing the test cases 108 in parallel threads can increase the speeds at which the test cases 108 can be executed, relative to executing the test cases 108 in sequence in a single thread. To prevent testing errors that might otherwise occur if related or dependent test cases 108 that use the same database data are executed in different parallel threads, the system 100 can also include a test conflict guard 112 configured to detect related or dependent test cases 108 that use the same data in the database 104. The test conflict guard 112 can prevent such related or dependent test cases 108 from being included in the set of test cases 108 that the test manager 106 distributes among different test sets 110, and thereby reduce or eliminate database errors or other testing errors that may otherwise cause test cases 108 to fail when executed in parallel.

The software application 102 can be a software program comprising computer-executable instructions associated with one or more functions. As a non-limiting example, the software application 102 can be an insurance policy management system that manages insurance policies by enabling creation, renewal, and/or termination of insurance policies associated with an insurance company, enabling users associated with the insurance company to view and/or edit information about insurance policies, and/or performing other tasks associated with management of insurance policies. In this example, information about insurance policies can be stored in the database 104, such that the software application 102 can access and/or edit information about the insurance policies in the database 104. In other examples, the software application 102 can be a billing and payment system, a customer management system, an order tracking system, an electronic commerce system, a database management system, or any other type of software that operates at least in part based on data stored in the database 104.

The software application 102 can be a compiled and/or executable version of code written in a programming language such as Gosu®, Java®, C++, C#, Python®, or any other programming language. For instance, in examples in which code for the software application 102 is written using Gosu® or Java®, the code can be compiled into an executable and/or deployable file, such as a web application archive (WAR) file or a Java® archive (JAR) file.

Over time, software developers can write new and/or updated code to create new and updated versions of the software application 102. For example, software developers may write new and/or updated code to implement new features of the software application 102, update or enhance existing features of the software application 102, update the software application 102 to communicate with other software applications, or for any other reason. As a non-limiting example, if the software application 102 is the insurance policy management system described above, software developers may write new code to integrate the insurance policy management system with a separate billing system, a separate customer management system, and/or other separate systems or applications.

The database 104 can be a relational database, non-relational database, object-oriented database, network database, hierarchical database, a flat file or other flat structured data storage element, or any other type of database or data storage element that stores records. In some examples, the database 104 may organize data into one or more tables that each have rows and columns. However, in other examples, the database 104 may store data in other formats without the use of tables.

The database 104 can contain any number of records 114A, 114B, 114C, etc. (referred to collectively herein as "records 114") having any number of attributes 116A, 116B, 116C, etc. (referred to collectively herein as "attributes 116"). In some examples, different records 114 can be represented as different rows of a table, while different attributes 116 of the records 114 can be represented as different columns of the table. In other examples, different records 114 can be represented in the database 104 without the use of rows and columns, or tables.

FIG. 1 shows a non-limiting example in which records 114 in the database 104, including a first record 114A, a second record 114B, and a third record 114C, are associated with insurance policies. These example records 114 can each include attributes 116, such a name attribute 116A, an address attribute 116B, a policy number attribute 116C, and/or other types of attributes 116. In other examples, records 114 and their attributes 116 can be associated with any other type of data, such as customer information, order information, billing information, or any other data.

Data in the database 104 can be accessed or changed using a query language, such as the Structured Query Language (SQL), and/or other types of commands or input. For example, the software application 102 may use SQL queries or other commands to add new records 114, edit existing records 114, delete records 114, retrieve one or more attributes 116 of one or more records 114, and/or otherwise interact with the database 104.

In some examples, the software application 102 can be tightly coupled with the database 104. For example, when software application 102 executes, software application 102 can create the database 104 as a tightly coupled database, such that the database 104 can store data used by the software application 102 during execution of the software application 102. In other examples, the software application 102 can be loosely coupled with the database 104. For instance, the database 104 can be initiated and/or maintained separately from the software application 102.

In some examples, the database 104 can be an in-memory database that stores data in random-access memory (RAM) or other volatile memory of a computing device. For instance, the database 104 can be instantiated as an in-memory database when the software application 102 is loaded or instantiated in memory. As an example, when the software application 102 is loaded into memory by a computing device for execution, the software application 102 may create a new instance of the database 104 as an in-memory database by defining one or more columns of one of more tables, or by otherwise instantiating the database 104. Thereafter, the software application 102 can add records 114 to the database 104, or otherwise access the database 104, after the in-memory database has been instantiated. For example, records 114 in the database 104 can be accessed based on test cases 108 in one or more test sets 110 that are executed in association with the software application 102 and the database 104, as discussed further below. In other examples, the database 104 can be stored in persistent memory such as hard disk drives, solid-state drives, or other non-volatile memory. In various examples, the database 104 can be an "H2mem" database, a "Postgres" database, or any other type of database.

In some examples, the database 104 can be a table-locking database. A table-locking database can be configured to at least briefly lock a table of the database 104, including all of the records 114 of that table, when any record in the table is accessed. For example, when a first software element accesses a record of a table, the table-locking database may lock the entire table such that other software elements are prevented from accessing or editing any data in the table while the first software element is accessing the table. As a non-limiting example, the database 104 can be an "H2mem" in-memory database with an "MVStore" engine that is configured to at least briefly lock an entire database table when the table is accessed.

In other examples, the database 104 can be a record-locking database. A record-locking database can be configured to at least briefly lock individual records 114 in the database 104 when such records 114 are accessed, instead of locking an entire table, another data structure larger than an individual record, or the entire database 104. As a non-limiting example, the database 104 can be an "H2mem" in-memory database that uses Multi-Version Concurrency Control (MVCC) to set database locks at a record level. In some examples, a record-locking database can permit software elements to simultaneously access different records 114 of the same database. For example, when the database 104 is a record-locking database, different methods 122 of different test sets 110 executing in different parallel threads can access different records 114 in the database 104 simultaneously.

In still other examples, the database 104 can be any other type of database that does or does not use tables. For example, the database 104 may be a non-relational database or flat file that stores records 114 without the use of tables.

Software developers can write code for test cases 108 designed to test the functionality of new or existing versions of the software application 102. For example, a software developer can use a programming tool 118 to write one or more test cases 108 for unit testing and/or integration testing of the software application 102. The programming tool 118 can be an integrated development environment (IDE), text editor, or other programming environment or tool that executes on a computing device and that can be used to write code for test cases 108, for example as discussed below with respect to FIG. 2.

The test cases 108 can be designed to verify whether a new or existing version of the software application 102 passes the test cases 108 and operates as intended by the software developers. The test cases 108 can test various scenarios regarding how the software application 102 can interact with the database 104. For instance, the test cases 108 may test whether the software application 102 can access the database 104, can access particular tables of the database 104, and/or can access particular records 114 in the database 104.

In some examples, there may be a relatively large number of test cases 108 in part due to regulatory requirements, state laws, business requirements, rules, and/or other factors. For instance, when the software application 102 is a policy management system that manages insurance policies, different states or jurisdictions may have different laws that impact how such insurance policies are to be managed. Accordingly, the set of test cases 108 can include one set of tests that attempt to verify that the software application 102 can successfully manage insurance policies according to the rules of one jurisdiction, as well as another set of tests that attempt to verify that the software application 102 can also successfully manage insurance policies according to the rules of another jurisdiction.

Code for the test cases 108 can be expressed in one or more classes 120A, 120B, . . . 120N, etc. (referred to collectively herein as "classes 120"). Each of the classes 120 can include one or more methods 122. For example, different classes 120 can be associated with different class files, each of which includes code for one or more methods 122. Individual methods 122 can set up data in the database 104 for tests, test functionality associated with the software application 102, output test results, or perform any other operation associated with testing of the software application.

Each method in a class may be a function, such as a function written in Gosu®, Java®, or another programming language. As an example, a file for a class can be a .gs file containing Gosu® code for one or more methods 122. The test cases 108 can include any number of files for classes 120, such as class 120A, class 120B, . . . and class 120N, as shown in FIG. 1. For example, class 120A can include methods 122A(1), 122A(2), 122A(3), etc. Different class files can include the same or a different amount of methods 122.

As discussed above, the system 100 for testing the software application 102 can include the test manager 106. The test manager 106 can be an executable software component or script that is configured to manage the execution of the test cases 108, including classes 120 and/or methods 122, with respect to the software application 102. In some examples, the test manager 106 can be associated with a build automation tool, such as Gradle®, that can build new versions of the software application 102, initialize an execution environment for the software application 102, and/or define tasks to be executed with respect to the software application 102. For example, the test manager 106 may create one or more Gradle® executors, or other scripts, code, configurations, or computer-executable instructions that cause one or more instances of the software application 102 to execute test cases 108 of different test sets 110 in association with the database 104, or otherwise cause the different test sets 110 to be executed in association with the database 104.

The test manager 106 can be configured to distribute the test cases 108 among different test sets 110. For example, as shown in FIG. 1, the test manager 106 can distribute at least some of the test cases 108 into any number of test sets 110A, 110B, . . . 110N, etc. (referred to collectively herein as "test sets 110"). The test manager 106 can cause the test sets 110 to be executed concurrently, in parallel, in association with the database 104. In some examples, the test manager 106 can obtain a list object, or other data, that identifies individual test cases 108. The test manager 106 can then distribute the individual test cases 108 among the different test sets 110 at a class level and/or a method level, as discussed further below.

In some examples, the test manager 106 can distribute test cases 108 to test sets 110 at a class level. In these examples, the test manager 106 can distribute all of the methods 122 of a particular class to the same test set, and may distribute methods 122 from other classes 120 to the same test set or other test sets 110. As a non-limiting example, the test manager 106 may assign the methods 122A of class 120A to the first test set 110A, and the methods 122B of class 120B to the second test set 110B. As another non-limiting example, the test manager 106 may assign the methods 122A of class 120A, and the methods 122B of class 120B, to the first test set 110A, and assign methods of other classes 120 to other test sets 110.

In some examples, the test manager 106 can also, or alternately, distribute test cases 108 to test sets 110 at a method level. In these examples, the test manager 106 can distribute subsets of the methods 122 of the same class among different test sets 110. As a non-limiting example, the test manager 106 may assign methods 122A(1) and 122A(2) of class 120A to the first test set 110A, but assign method 122A(3) of class 120A to the second test set 110B. In some examples, the test manager 106 may also allocate subsets of methods 122 from different classes 120 to the same test set when distributing test cases at a method level. As a non-limiting example, the test manager 106 may assign method 122A(3) of class 120A to the second test set 110B, and also assign method 122B(3) to the second test set 110B.

In some cases, the test manager 106 may dynamically distribute an equal number of test cases 108 to different test sets 110. In other cases, the test manager 106 may dynamically distribute an unequal number of test cases 108 to different test sets 110, for instance based on predicted execution times or other factors.

As a first non-limiting example of distributing an unequal number of tests cases 108 to different test sets 110, the test manager 106 may determine that a set of five hundred methods from a first class is expected to take approximately five minutes to execute. However, the test manager 106 may determine that a second class and a third class each have only two hundred methods, and that together the four hundred methods of the second class and the third class may also take approximately five minutes to execute. Accordingly, the test manager 106 may assign the five hundred methods from a first class to a first test set, and assign the four hundred methods from the second class and the third class to a second test set. This may eliminate or reduce idle processor cycles or server time, relative to assigning each of the three classes to different test sets and waiting for the four hundred methods of the first class to complete after the two hundred methods of the second class and the third class have each completed separately in other parallel threads.

As a second non-limiting example of distributing an unequal number of tests cases 108 to different test sets 110, the test manager 106 may determine that a first subset of three hundred test cases 108 is expected to take approximately five minutes to execute, and may determine that a second subset of one thousand other test cases 108 is also expected to take approximately five minutes to execute. Accordingly, the test manager 106 may assign the first subset of the three hundred test cases 108 to a first test set, and assign the second subset of one thousand test cases 108 to a second test set, such that both test sets are expected to take approximately the same amount of time to execute despite differing numbers of test cases in the two test sets.

The test manager 106 can also be configured to cause different test sets 110 to execute simultaneously, in parallel, in association with the software application 102 and the database 104. For example, a computing device can initiate a first instance of the software application 102 in a first parallel thread, and also initiate a second instance of the software application 102 in a second parallel thread. The computing device can accordingly execute a first set of methods 122 assigned to the first test set 110A in the first parallel thread, and simultaneously execute a second set of methods 122 assigned to the second test set 110B in the second parallel thread. Methods 122 assigned to a test set may execute in sequence with respect to other methods 122 within the same test set, however the computing device can execute different methods 122 associated with different test sets 110 in different parallel threads at substantially the same time. The test manager 106 may also collect test results associated with the methods and/or classes of different test sets 110 that execute in different parallel threads, and combine the test results into an aggregated test result report, for example as discussed below with respect to FIG. 3.

The computing device can use virtual machines, hyper-threading, parallel threads, and/or any other type of parallelization to execute test cases 108 assigned to different test sets 110 in parallel at substantially the same time. The computing device can set up and use any number of parallel threads, depending on the memory, processing power, and/or other computing resources available to the computing device. For example, the computing device can be a server that has 128 GB of memory and 16 CPUs. In this example, if different instances of the software application 102 each use approximately 15 GB of memory when executed via virtual machines, the computing device may initialize eight parallel threads that are each allocated 16 GB of memory. The test manager 106 can accordingly distribute the test cases 108 among eight test sets 110 that correspond to the eight parallel threads.

In some examples, the test manager 106 can use a Java® concurrent "ExecutorService," or other system, to initialize a fixed number of parallel threads in a thread pool, distribute the methods 122 of the test cases 108 among different test sets 110 associated with different initialized parallel threads, and use one or more callable objects to execute the methods 122 of the different test sets 110 in association with the parallel threads. In some examples, the test manager 106 can use tasks or scripts associated with a build automation tool, such as Gradle®, to distribute the methods among test sets 110 and to cause execution of the test sets 110 in parallel. For example, the test manager 106 can use Gradle® tasks or other scripts to dynamically set up different executors associated with the software application 102 in different parallel threads, distribute methods 122 of the test cases 108 among different test sets 110 associated with the parallel threads at a class level and/or a method level, cause the different executors to execute the methods 122 of the test sets 110 in parallel, and/or to combine corresponding sets of test results into an aggregated test result report.

As a non-limiting example, if the test cases 108 contain seven thousand classes 120, the test manager 106 may divide the seven thousand classes 120, at a class level, into seven different test sets 110 that each contain methods 122 aggregated from a different set of approximately one thousand classes 120. Each of these seven test sets 110 can be associated with a different thread of a pool of seven parallel threads. The test manager 106 can cause the seven test sets 110 to be executed in parallel, substantially simultaneously, via the seven different parallel threads. Accordingly, the full set of seven thousand classes 120 may execute in parallel more quickly than the seven thousand classes 120 could execute in sequence in a single thread. Executing the classes 120 in parallel can also reduce server time or usages of other computing resources, relative to executing the classes 120 in a single thread.

As another non-limiting example, if a particular class includes a set of one hundred methods 122, the test manager 106 may divide those one hundred methods 122, at a method level, into multiple test sets 110 that can be executed simultaneously in parallel threads. Accordingly, the full set of one hundred methods 122 can execute in parallel more quickly than executing the full set of one hundred methods 122 in sequence in a single thread. Executing the methods 122 in parallel can also reduce server time or usages of other computing resources, relative to executing the methods 122 in a single thread.

Software developers may attempt to write one or more test cases 108 that depend on, or build on, data in the database 104 that the developers assume one or more related test cases 108 would already have created in the database 104. Software developers may also attempt to write test cases 108 that access the same table or record in the database 104. Such dependent or related test cases 108 may be likely to succeed if the test cases 108 were executed sequentially in a single thread in the order expected by the software developers. However, there is a risk that if dependent or related test cases 108 are assigned to different test sets 110 that execute in parallel, the dependent or related test cases 108 may execute in different parallel threads concurrently and/or in a different order than the software developers intended. Executing dependent and/or related test cases 108 in different parallel threads, in a different order than developers intended, can cause errors that may lead to failure of one or more test cases 108. Such test failures may prolong testing times, cause users to edit test cases 108 after test failures, cause the system 100 to repeat test executions, and/or otherwise lead to an inefficient usage of computing resources.

As a first example, parallel execution of related or dependent test cases 108 may lead to missing data errors associated with the database 104. For example, developers may have written a first test case that attempts to create a particular record in the database 104. The developers may also have written a second test case that attempts to access or edit that particular record. The second test case may have been written under the assumption that, by the time the second test case executes and attempts to access the particular record, the first test case will already have executed and created the particular record in the database 104. However, if these two test cases are instead run in parallel as part of different test sets 110, there is a chance that the second test case may execute in one parallel thread earlier than the first test case executes in another parallel thread. Accordingly, if the parallelization were to cause the second test case to execute earlier than the first test case, the second test case may fail when it attempts to access a record that that the first test case has not yet created.

As a second example, parallel execution of related test cases 108 may lead to database conflict errors. For example, two test cases 108 may attempt to access the same table in the database 104, and/or the same record in the database 104. The two test cases 108 may have been written under the assumption that, in the intended execution order, the test cases 108 would execute at different times and thus access the same table and/or record at different times. However, there is a chance that if the two test cases 108 are assigned to different test sets 110, the two test cases 108 may execute in different parallel threads substantially simultaneously. Accordingly, the two test cases 108 may attempt to access the same table and/or record substantially simultaneously, and corresponding database conflicts may cause one or both of the test cases 108 to fail. For instance, if the database 104 is a table-locking database, the first test case to execute in a first parallel thread may access a record of a database table, and thereby cause the entire table to be locked in the database 104. The second test case may execute in a second parallel thread while the table is still locked after being accessed by the first test case. Accordingly, the second test case may fail because it is unable to access data in the locked table. If the database 104 is instead a record-locking database, a particular record in the database 104 may become locked when accessed by the first test case. If the second test case executes in a different parallel thread and attempts to access that same particular record while the record is locked, the second test case may fail because it is unable to access data in the locked record.

To prevent or reduce such database conflicts, which may otherwise occur if dependent and/or related test cases 108 that use the same database data are executed in parallel, the test conflict guard 112 can be configured to verify that the test cases 108 are written as independent test cases 108 that use distinct data in the database 104. In some examples, the test conflict guard 112 can detect any related or dependent test cases 108 that use the same data in the database 104 or build on each other, and/or output warnings if the test conflict guard 112 determines that any of the test cases 108 are related or dependent. If the test conflict guard 112 verifies that the test cases 108 are independent test cases 108 that use distinct data in the database 104, the test conflict guard 112 can indicate that the test manager 106 can distribute the test cases 108 among different test sets 110 that will be executed in parallel.

The test conflict guard 112 can be configured to evaluate source code of test cases 108 and/or draft test cases 124 prepared in the programming tool 118, to determine if any of the test cases 108 and/or draft test cases 124 are related or dependent test cases 108. For example, the test conflict guard 112 can compare source code of different test cases 108 and/or draft test cases 124 to determine if the different test cases 108 and/or draft test cases 124 retrieve data from the same database tables or records, edit the same database tables or records, use the same global variables, use other types of the same data in the database 104, and/or are otherwise related or dependent.

In some examples, the test conflict guard 112 can be a component of the programming tool 118, as discussed further below with respect to FIG. 2. For example, the test conflict guard 112 can evaluate one or more draft test cases 124 being prepared via the programming tool 118, to determine whether a draft test case 124 uses the same database data as one or more other draft test cases 124 or one or more existing test cases 108. If the test conflict guard 112 determines that a draft test case uses the same database data as another draft test case or one or more of the existing test cases 108, the test conflict guard 112 may display a warning or error in the programming tool 118. Such a warning or error may prompt a user to rewrite some or all of the draft test case so that it becomes an independent test case that does not use the same database data as another test case. The test conflict guard 112 may block the programming tool 118, or an associated computing device, from adding draft test cases 124 to the set of test cases 108 until the test conflict guard 112 verifies that the draft test cases 124 are independent and do not use database data used by any other test case.

In other examples, the test conflict guard 112 can be a component of the test manager 106 that evaluates existing test cases 108 and/or new draft test cases 124 received from the programming tool 118. In these examples, the test conflict guard 112 may block the test manager 106 from new adding draft test cases 124 to the set of test cases 108, and/or block the test manager 106 from distributing test cases 108 among multiple test sets 110 associated with different parallel threads, unless the test conflict guard 112 verifies the test cases 108 and new draft test cases 124 received from the programming tool 118 are independent and do not use database data used by any other test case. If the test conflict guard 112 determines that any of the test cases 108 or new draft test cases 124 are dependent or related, the test conflict guard 112 may cause the test manager 106 to output an error, warning, or test report identifying the dependent or related test cases 108 and/or otherwise indicating that dependent or related test cases 108 should be revised to be independent before the test cases 108 are executed in parallel.

In still other examples, the test conflict guard 112 can be a separate executable software component or script that is configured to evaluate existing test cases 108 and/or new draft test cases 124 received from the programming tool 118. In these examples, the test conflict guard 112 may block the programming tool 118 from new adding draft test cases 124 to the set of test cases 108, and/or block the test manager 106 from distributing test cases 108 among multiple test sets 110 associated with different parallel threads, unless the test conflict guard 112 verifies the test cases 108 and new draft test cases 124 received from the programming tool 118 are independent. For example, the test conflict guard 112 may block the programming tool 118 from distributing test cases 108 among test sets 110 to be executed in parallel, unless the test conflict guard 112 determines that each of the test cases 108 are independent and do not use database data used by any other test case. If the test conflict guard 112 determines that any of the test cases 108 or new draft test cases 124 are dependent or related, the test conflict guard 112 may output an error, warning, or test report identifying the dependent or related test cases 108 and/or otherwise indicating that dependent or related test cases 108 should be revised to be independent before the test cases 108 are executed in parallel.

Overall, by verifying that none of the test cases 108 use data in the database 104 that other test cases 108 also use, the test conflict guard 112 can prevent missing data errors, table-locking errors, record-locking errors, and/or other testing errors that might otherwise occur if dependent or related test cases 108 execute in different parallel threads in a different order than developers assumed. If the test conflict guard 112 determines that any of the test cases 108, or draft test cases 124, are related or dependent test cases 108, the test conflict guard 112 can cause a warning or other message to be displayed to a user, for example as described below with respect to FIG. 2. Such a warning or message can prompt the user to change the related or dependent test cases 108 to be independent test cases 108 before they the test cases 108 are distributed by the test manager 106 and executed in parallel. Accordingly, the test conflict guard 112 can confirm that the test cases 108 distributed by the test manager 106 among different test sets 110 executed in parallel are independent test cases 108, and thereby avoid testing errors that can cause test cases to fail, prolong testing times, and/or lead to an inefficient usage of computing resources.

In some examples, the test conflict guard 112 may additionally be configured to evaluate source code for test cases 108 and/or the software application 102 to detect other types of issues that may result in increased testing times and/or resource usage when test cases 108 are executed in parallel as part of different test sets 110. For example, the test conflict guard 112 may be configured to detect instances in which a source code instantiates the same object multiple times, instead of re-using an object that has already been instantiated in memory. Instantiating the same object multiple times may lead to longer code execution times, higher amounts of processor cycles, increased memory usage, and/or otherwise increase usage of computing resources, particularly when testing is performed in multiple parallel threads. For instance, if source code is configured to instantiate the same object in memory multiple times, and multiple instances of the software application 102 are executed during testing in parallel as described above, the same object may be instantiated a large number of times across a set of parallel threads. Thus, the parallelization during testing may further increase usage of computing resources if the source code is configured instantiate the same object in memory multiple times. The test conflict guard 112 may accordingly be configured to evaluate source code to identify instances in which the same object is instantiated multiple times in memory, instead of using an already-instantiated object with new data, and provide a corresponding warning or message to a user. The user may respond to such a warning by editing the source code to more efficiently re-use instantiated objects. The test conflict guard 112 may similarly be configured to evaluate source code to identify other types of programming practices that may lead to increased usage of computing resources, particularly when testing is executed in parallel, and to present corresponding warnings or messages to users associated with the source code.

Figure 2:
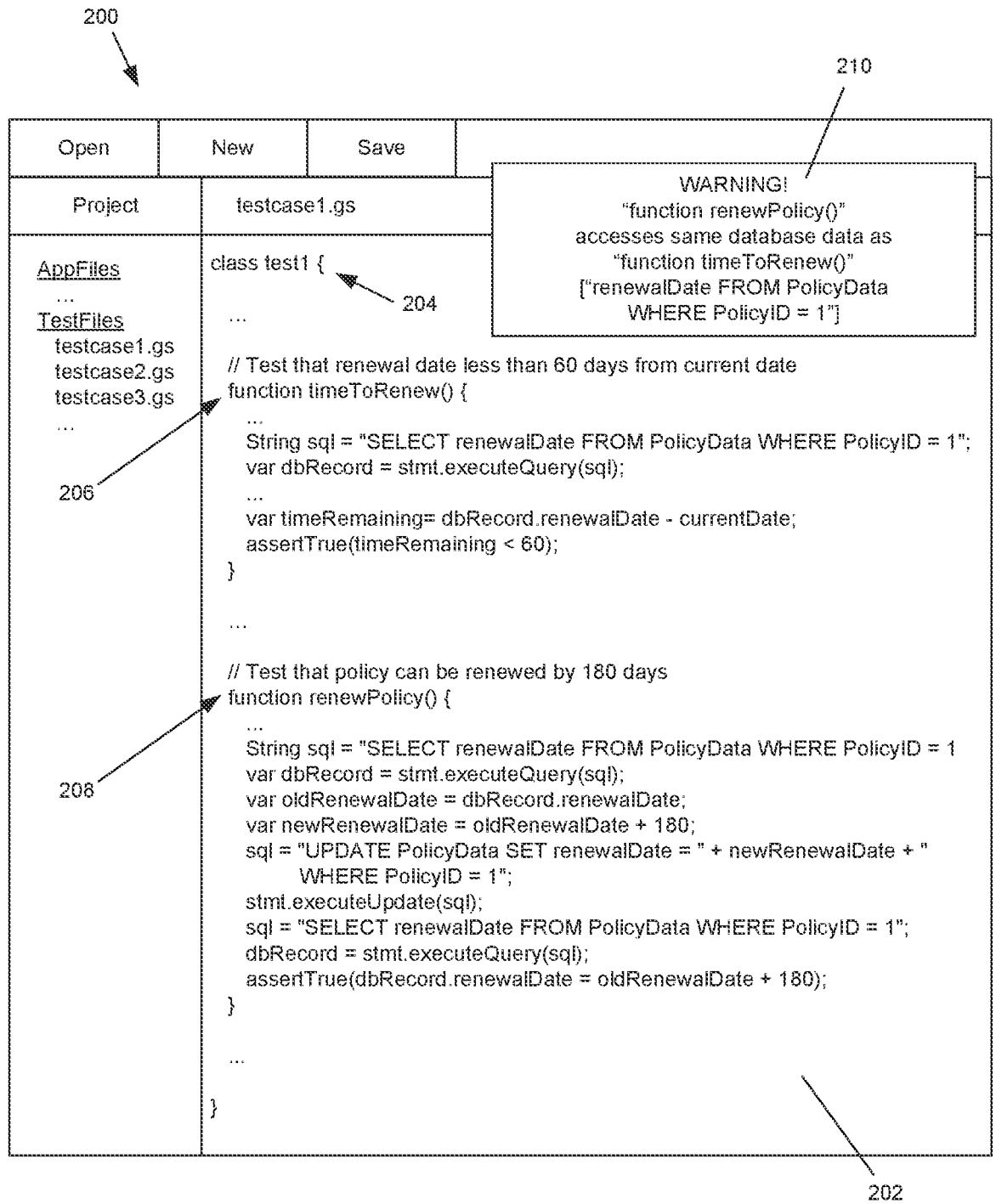
FIG. 2 shows an example user interface for a programming tool.

FIG. 2 shows an example user interface (UI) 200 for a programming tool 118. The programming tool 118 may be an IDE, text editor, or other programming environment or tool. In some examples, the programming tool 118 may execute on the same computing device as the test manager 106. However, in other examples, the programming tool 118 may execute on a different computing device than the test manager 106, for instance on a computing device associated with a software developer who is writing code for one or more draft test cases 124 before submitting the draft test cases 124 to be included in the test cases 108 that will be distributed by the test manager 106 among different test sets 110 during testing of the software application 102. In some examples, the programming tool 118 may also load one or more existing test cases 108 so that source code for the test cases 108 can be viewed and/or edited.

The UI 200 can include a text window 202 that displays source code for one or more test cases 108, such as a new draft test case or an existing test case. As discussed above, classes 120 can include one or more methods 122. Accordingly, the source code shown in the text window 202 can include code for a class 204, which may encompass code for a first method 206, a second method 208, and/or other methods 122.

In the example shown in FIG. 2, the first method 206 and the second method 208 are written as related test cases 108. For example, the first method 206 is configured to verify that test record for an insurance policy (with a policy ID of "1") in the database 104 indicates that the insurance policy is due for renewal in less than 60 days. The second method 208 is configured to verify that the same test record for the same insurance policy (with the policy ID of "1") in the database 104 can be updated with a new renewal date, to reflect a renewal of the insurance policy for 180 days. If the first method 206 and the second method 208 were executed in sequence in a single thread as written, the first method 206 may verify that the test record indicates that the insurance policy is due for renewal in less than 60 days, the second method 208 may then verify that same test record can be updated in the database 104 to extend its renewal date by 180 days, and the first method 206 and the second method 208 may output successful test results. However, if the first method 206 and the second method 208 were instead executed in different parallel threads, there is a chance that the second method 208 may execute in one parallel thread before the first method 206 executes in another parallel threads. In that situation, the second method 208 may succeed in extending the renewal date of the insurance policy in the test record by 180 days. If the first method 206 then executes at a later point in time in a different parallel thread, the first method 206 may output a test failure because the test record has been edited and no longer indicates that the insurance policy is due for renewal in less than 60 days.

However, in the example shown in FIG. 2, the test conflict guard 112 may analyze the source code for the first method 206 and the second method 208. The test conflict guard 112 can determine that the first method 206 and the second method 208 are both configured to access the same renewal date attribute of the same record in the database 104. Based on this determination, the test conflict guard 112 can cause the UI 200 of the programming tool 118 to display a warning message 210 associated with the first method 206 and the second method 208.

For example, the warning message 210 can inform a user that the first method 206 and the second method 208 are currently written as related or dependent test cases 108 that access or use the same data in the database 104. The warning message 210 may also identify any variables, code fragments, or other data that indicates that the first method 206 and the second method 208 are currently written as related or dependent test cases 108. For instance, the warning message 210 can indicate that the first method 206 and the second method 208 are both currently configured to access the same renewal date attribute of the same record in the database 104.

In other examples, the warning message 210 may identify any other related or dependent test cases 108 detected by the test conflict guard 112. For instance, the warning message 210 may indicate that different classes 120 that use the same database data, specific methods 122 of different classes 120 use the same database data, and/or any combinations of test cases 108 that use the same database data and are therefore dependent and/or related test cases 108.

In some examples, the test conflict guard 112 may also be configured to evaluate source code for test cases 108 and/or the software application 102, and detect one or more predefined poor programming practices reflected in the source code. The predefined poor programming practices may be issues that could lead to increased memory usage, an increased number of processing cycles, increased execution times, and/or other increased usage of computing resources when test cases 108 are executed in parallel. For example, the test conflict guard 112 may be configured to detect instances in which the source code re-instantiates the same object in memory multiple times, instead of instantiating the object once in memory and then re-using the instantiated object with new data. In these examples, the test conflict guard may cause the UI 200 of the programming tool 118 to display a warning message, such as warning message 210, informing a user that a particular poor programming practice has been detected in the source code.

The test conflict guard 112 may, in some examples, prevent a user from saving draft test cases 124 until issues associated with warning messages, such as the warning message 210, are resolved. For example, in FIG. 2, the warning message 210 may prompt a user to revise the class 204 so that the operations the first method 206 and the second method 208 are combined into a single method that first checks that a test record indicates that an insurance policy is due for renewal in less than 60 days, and if so then verifies that same test record can be updated in the database 104 to extend its renewal date by 180 days. If such code were combined into a single method, the test conflict guard 112 may determine that there are no longer any dependent or related test cases 108, and the test conflict guard 112 may permit the code to be saved and provided to the test manager 106. The test manager 106 can then assign the code of the method to one thread, and the code of the method can be executed in that thread in an intended order to achieve a successful test result even if other test cases 108 are executed concurrently in other parallel threads.

Alternatively, the warning message 210 may prompt a user to revise the class 204 so that the operations the first method 206 and the second method 208 access renewal dates of different records, and thus no longer use the same data in the database 104. For instance, although in FIG. 2 the code for the first method 206 and the second method 208 both access the same renewal date attribute of the same record for the same insurance policy (with the policy ID of "1") in the database 104, the user may choose to edit the second method 208 to attempt to edit a renewal date attribute of a different test record for a different insurance policy (e.g., with a policy ID of "2" or any other policy ID) in the database 104. Such an edit may cause the test conflict guard 112 to determine that the first method 206 and the second method 208 no longer use the same data in the database 104, and the test conflict guard 112 may permit the code to be saved and provided to the test manager 106. In this situation, even if the test manager 106 assigns the first method 206 and the second method 208 to different parallel threads and the second method 208 executes before the first method 206, the database change made by the second method 208 would not impact the database data used by the first method, and thus would not prevent the first method 206 from outputting successful test results.

Accordingly, the test conflict guard 112 can prevent related and/or dependent test cases 108 from being provided to the test manager 106. The test manager 106 can thus be provided with a set of independent test cases 108, dynamically assign independent test cases 108 among different test sets 110, and cause the different test sets 110 to be executed in parallel to test the software application 102, for example as discussed below with respect to FIG. 3. Executing the independent test cases 108 in parallel can reduce testing time overall, relative to executing the test cases 108 in sequence. Moreover, by using the test conflict guard 112 to ensure that the test cases 108 are independent, database errors or other testing errors that may otherwise occur when executing dependent or related test cases 108 in different parallel threads can be reduced and/or eliminated.

In other examples, the test conflict guard 112 may detect issues in source code and cause the UI 200 to display corresponding warning messages, but allow users to override the warning messages and save the source code. In such examples, the test cases 108 may be provided to the test manager 106 despite one or more warning messages displayed via the UI 200, based on a user override. This may allow testing to proceed at a local level and/or based on a merge with a main code branch, as discussed further with respect to FIG. 4 below. In other examples, the test conflict guard 112 may permit local testing despite warnings, but block merge operations with a main code branch until such warnings have been resolved.

Figure 3:
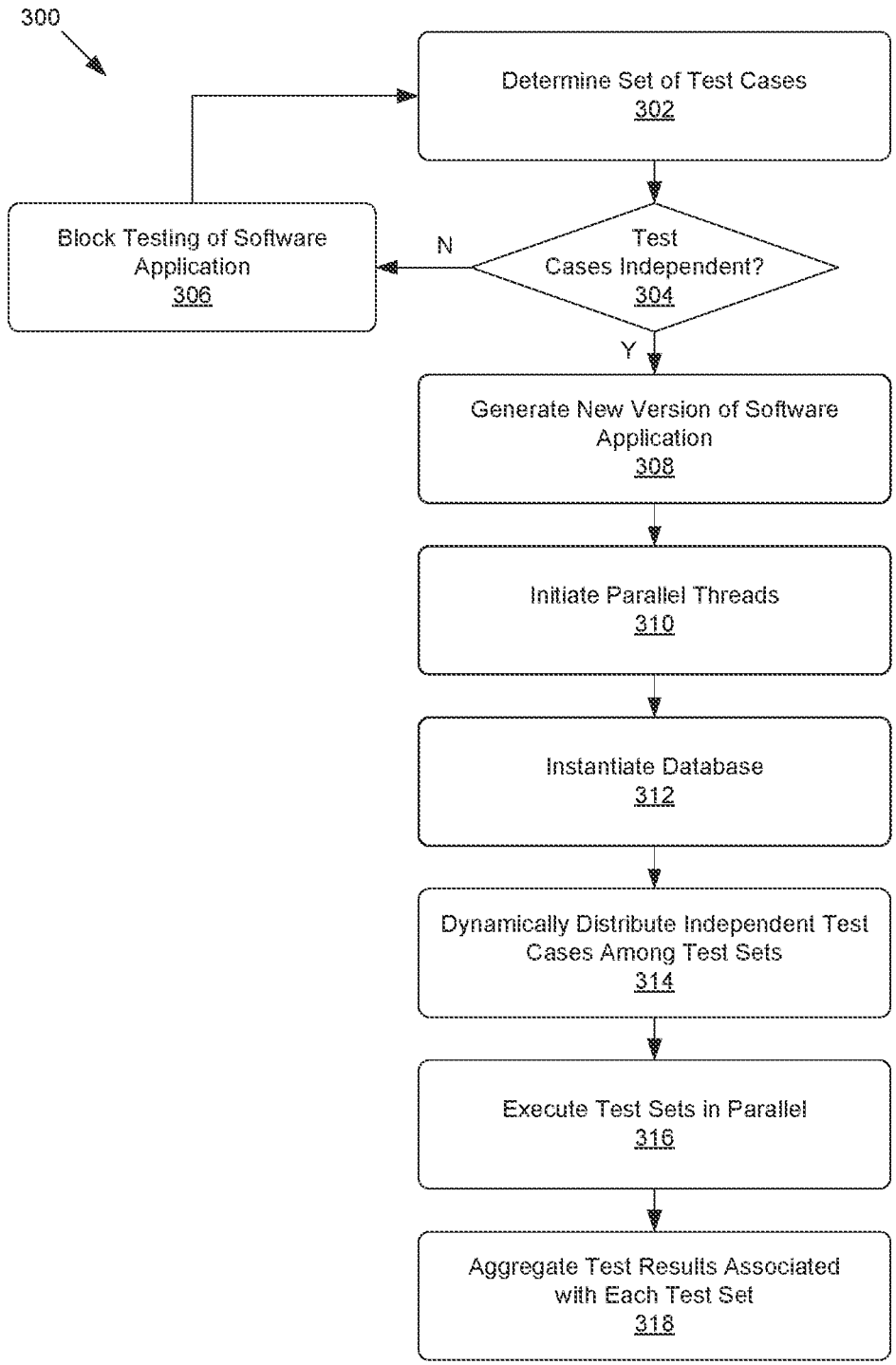
FIG. 3 shows a flowchart of a first example process for generating and testing the software application using independent test cases.

FIG. 3 shows a flowchart of a first example process 300 for generating and testing the software application 102 using independent test cases 108. At block 302, a computing system can determine a set of test cases 108 to be used to test the software application 102. The set of test cases 108 can include pre-existing test cases. The set of test cases 108 can also, or alternately, include one or more draft test cases 124 that are output by the programming tool 118 or that are being prepared in the programming tool 118.

At block 304, the computing system can determine if the test cases 108, in the set of test cases 108 determined at block 302, are independent test cases 108 that each use distinct data in the database 104. The computing system can execute the test conflict guard 112 to examine source code of the test cases 108 and determine whether any of the test cases 108 are related or dependent test cases 108, or whether all of the test cases 108 are independent test cases 108. For example, the test conflict guard 112 can examine source code to determine if any of the test cases 108 are related or dependent test cases 108 that retrieve data from the same database tables or records, edit the same database tables or records, use the same global variables, and/or otherwise use the same data in the database 104.

If the computing system determines that at least some of the test cases 108 are related and/or dependent on each other (Block 304—No), the computing system can block testing of the software application at block 306. The computing system can, for example, prevent the test manager 106 from setting up a testing environment for the software application 102, prevent the test manager 106 from distributing test cases 108 among test sets 110, and/or otherwise prevent testing the software application using related and/or dependent test cases 108. If testing of the software application is blocked at block 306, users can revise one or more test cases 108 to attempt to make the set of test cases 108 independent such that the test cases 108 each use distinct data in the database 104. The computing system can then attempt again at block 304 to determine if all of the test cases 108 are independent test cases 108.

If the computing system determines that all of the test cases 108 are independent (Block 304—Yes), the computing system can proceed with testing the software application 102 at blocks 308-318. In some examples, if the computing system determines that not all of the test cases 108 are independent, and that at least some of the test cases 108 are related and/or dependent on each other (Block 304—No), the computing system can display a corresponding warning at block 306. The user may choose to heed the warning and revise the test cases 108 at block 302, or override the warning and proceed with testing the software application 102 at blocks 308-318.

In some examples, the computing system may also block testing and/or provide a warning at block 306 if the test conflict guard 112 detects one or more predefined poor programming practices reflected in the source code that may lead to increased usage of computing resources when test cases 108 are executed in parallel. For instance, a warning may be displayed if the test conflict guard 112 detects instances in which the source code re-instantiates the same object in memory multiple times, instead of instantiating the object once in memory and then re-using the instantiated object with new data. In such examples, the computing system can proceed with testing the software application 102 at blocks 308-318 after the source code is revised to avoid such programming practices, or based on a user instruction to override the warning.

At block 308, the computing system can generate a new version of the software application 102. For example, a developer may have written new code, and/or changed existing code, associated with the software application 102. The developer can submit the new code to a compiler or code management system, and request that the new and/or changed code be compiled, along with unchanged code, into a new executable version of the software application 102. For example, at block 308, the computing system can generate a new version of the software application 102 as a new executable and/or deployable WAR file or JAR file. In some examples, at block 308 the computing system can use tasks of a build automation tool, such as Gradle®, to build the new version of the software application 102. In some examples, if a version of the software application 102 to be tested has already been compiled or generated, block 308 can be skipped.

At block 310, the computing system can initiate a set of parallel threads. For example, the test manager 106 can use Gradle® tasks, or tasks of another build automation tool, to dynamically set up an execution environment that includes a set of parallel threads, and different executors associated with the software application 102 in different parallel threads. In some examples, at block 310 the test manager 106 can use a Java® concurrent "ExecutorService" to initialize a fixed number of parallel threads in a thread pool.

At block 312, the computing system can instantiate the database 104. For example, at block 312 the test manager 106 can use Gradle® tasks, or tasks of another build automation tool, to instantiate the database 104 in memory as an in-memory database, such as a record-locking database, a table-locking database, or any other type of database. As another example, the software application 102 can create the database 104 when the software application 102 is loaded or executed. For instance, the software application 102 can be tightly coupled to the database 104, such that the software application 102 creates the database 104 when the software application 102 executes.

At block 314, the computing system can dynamically distribute the test cases 108, verified as being independent test cases 108 at block 314, among different test sets 110. For example, at block 314 the test manager 106 can assign one group of independent test cases 108 to a first test set, another group of independent test cases 108 to a second test set, and still other groups of independent test cases 108 to other test sets 110. Each test set can be associated with a different parallel thread of the parallel threads initiated at block 310. In some examples, the computing system can dynamically distribute independent test cases 108 among different test sets 110 based on predicted execution times, aggregated numbers of test cases 108 assigned to each test set 110, and/or other factors.

At block 316, the computing system can cause the test sets 110 to execute, in the parallel threads, in association with the database 104. For example, at block 316 the test manager 106 can use one or more callable objects to execute the methods 122 of the different test sets 110 in association with the parallel threads. Individual test cases 108 in the test sets 110 may succeed or fail when executed at block 316.

At block 318, the computing system can aggregate results of the tests associated with the test cases 108. In some examples, the test manager 106 can receive different sets of test results associated with different test sets 110 that execute in different parallel threads, such as test results indicating whether individual test cases 108 succeeded or failed at block 316. The test manager 106 can combine the different sets of test results into a single aggregated test result report, or otherwise aggregate the test results. The test manager 106 may output the single aggregated test result report, for instance in a format that is visible and/or usable by a user. In other examples, the test manager 106 may aggregate test results into any other format. The aggregated test results may indicate whether the version of the software application 102 passed all of the test cases 108 executed at block 316.

The aggregated test results may indicate whether or not the software application 102 passed all of the test cases 108 executed at block 316. In some examples, if the software application 102 did not pass all of the test cases 108 executed at block 316, the aggregated test results may identify which test cases 108 did not pass, and/or provide corresponding diagnostic details about test failures and/or errors. Such aggregated test results associated with failed tests may in some cases be used by software developers when re-coding or changing the software application 102 after test failures, as discussed further below with respect to FIG. 4. In some examples, after generating and/or outputting the aggregated test results, the test manager 106 may discard the different individual sets of test results that were generated in association with different test sets 110.

In some examples, at the conclusion of testing, the computing system can also de-allocate memory or other computing resources associated with the software application 102 and the database 104. For example, if server memory had been allocated to execute eight test sets 110 in association with the database 104, the allocated memory can be deallocated and/or cleaned up to prepare the server for a subsequent round of testing.

Process 300 can be used to determine whether a version of software application passes a set of independent test cases 108. As will be discussed further below with respect to FIG. 4, if the version of the software application does not pass all the independent test cases 108 executed at block 316, the version of the software application can be re-coded or otherwise changed until it does pass all of the independent test cases 108 executed at block 316. However, as will also be discussed below with respect to FIG. 4, if the version of the software application does pass all the independent test cases 108 executed at block 316, passing all the test cases 108 executed at block 316 may indicate that the version of the software application is suitable to deploy in other environments, such as other testing environments, in other development environments, and/or in production environments.

In some examples, process 300 can be used for local testing of the software application based on changes made by a single developer, and/or for global testing of the software application based on changes made by multiple developers, as discussed further below with respect to FIG. 4. In both situations, by distributing independent test cases 108 among different test sets 110 and executing the test sets 110 in parallel, overall testing times can be reduced relative to executing the test cases 108 in sequence. Additionally, by using the test conflict guard 112 to verify that the test cases 108 executed at block 316 are independent, and do not include related and/or dependent test cases 108 that use the same database data, database errors and other testing errors that may occur if related and/or dependent test cases 108 are executed in parallel can be avoided.

Figure 4:
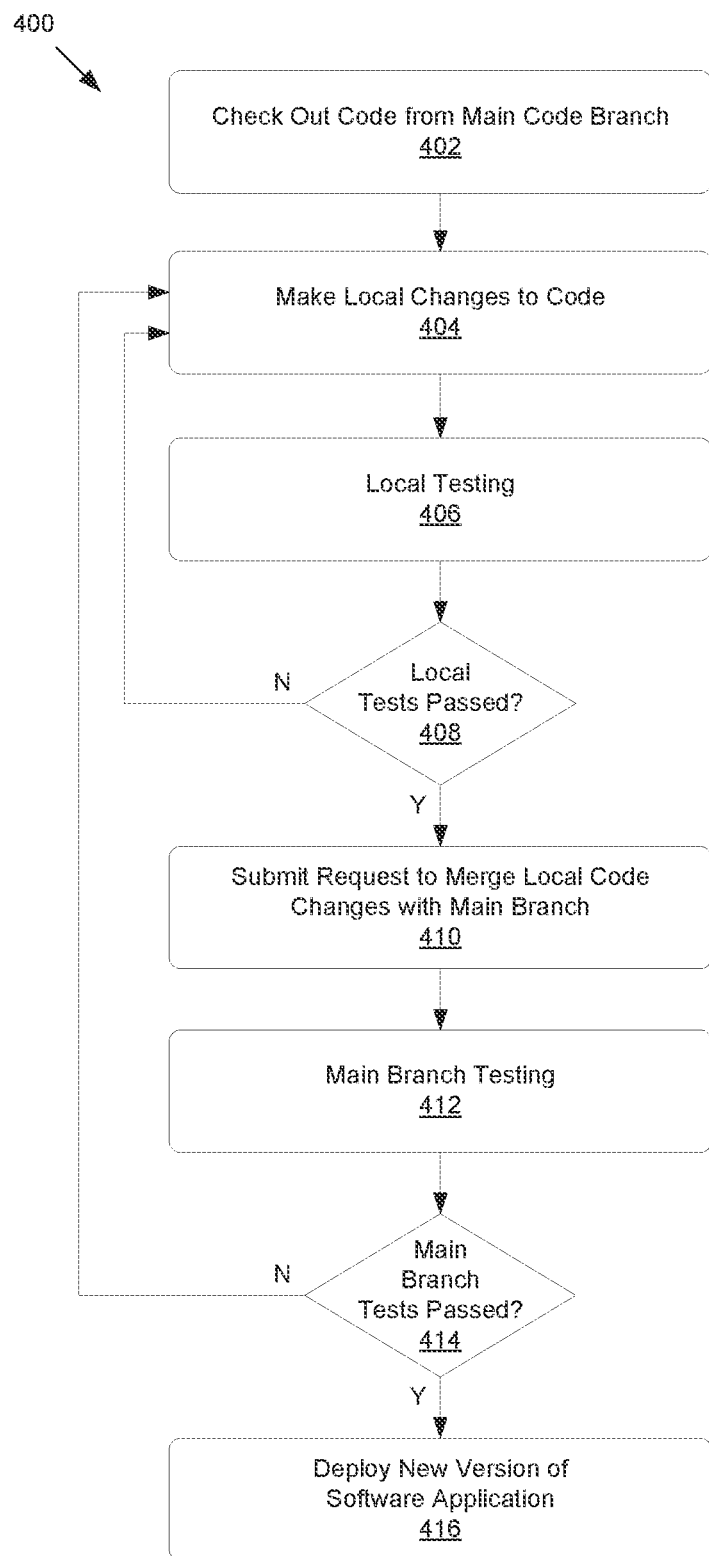
FIG. 4 shows a flowchart of a second example process for testing a software application using independent test cases.

FIG. 4 shows a flowchart of a second example process 400 for testing the software application 102 using independent test cases 108. At block 402, a computing device associated with a software developer can check out source code associated with the software application 102 and/or the test cases 108 from a main code branch. The source code can be stored in a main code branch at a central repository available to a team of software developers. The computing device may receive a "check out" command from the software developer. Such a "check out" command, or other command, can cause the computing device to retrieve a copy of the source code from the central repository, and thereby check out the source code from the main code branch. Accordingly, at block 402, a computing device associated with a particular software developer can transfer a copy of the source code from the central repository and thus check out a copy of the source code from the main code branch.

At block 404, the computing device can make changes to the source code associated with the software application 102 and/or the test cases 108 locally. For example, the computing device can display the source code within the UI 200 of the programming tool 118, as shown in FIG. 2, or via a similar programming environment. The software developer can type new code and/or input other commends via the programming environment, which can cause the computing device to edit the source code checked out at block 402.

As an example, input provided by the software developer can cause the computing device to add new code or change existing code associated with the software application 102. As another example, input provided by the software developer can cause the computing device to add or change configuration files or other settings associated with the software application 102. As yet another example, input provided by the software developer can cause the computing device to add edit code for test cases 108, including adding one or more new test cases 108, removing one or more test cases 108, and/or changing source code for one or more test cases 108.

At block 406, the computing device can initiate local testing of the software application based on the local changes to the source code associated with the software application 102 and/or the test cases 108. The local testing can include the operations of example process 300 shown and described with respect to FIG. 3. For instance, the computing device, or a separate centralized computing device, can verify that the test cases 108 are independent, build a new version of the software application based on the local code changes associated with the software application 102 and/or the test cases 108 made at block 404, distribute independent test cases 108 among different test sets 110, execute the test sets 110 in parallel, and output an aggregated test result report based on test results corresponding to the different test sets 110.

In some examples, as discussed above with respect to FIG. 3, the test conflict guard 112 may block local testing or provide a corresponding warning if the test conflict guard 112 detects issues with source code, including based on local changes made at block 404. Accordingly, in some examples, the local testing may proceed at block 406 after the test conflict guard 112 determines that such issues are not present or have been resolved, or based on a user instruction to override warnings associated with such issues.

At block 408, the system can determine whether the new version of the software application, built and tested based on local changes to the source code, passed all of the test cases 108 executed locally in parallel at block 406. If the aggregated test result report indicates that the new version of the software application did not pass all of the test cases 108 executed locally at block 406 (Block 408—No), the software developer can provide input that causes the computing device to make further changes to the source code locally at block 404, and the computing device can retry local testing at block 406. However, if the aggregated test result report indicates that the new version of the software application did pass all of the test cases 108 executed locally (Block 408—Yes), the computing device can submit a merge request at block 410. For example, based on the aggregated test result report indicating that local testing has succeeded, the software developer can input a command that causes the computing device to submit a merge request.

The merge request submitted at block 410 can be a request to combine the local code changes associated with the software application 102 and/or the test cases 108 made at block 404 with the main code branch, such that the code changes become part of the main code branch, override previously existing code in the main code branch, and can be checked out from the main code branch by computing devices associated with other software developers. Although the local code changes may have passed local testing, the main code branch may have changed between blocks 402 and 410, for instance if other code changes made by other software developers have been merged into the main branch such that the local changes made at block 404 to code checked out from the main code branch at block 402 would conflict with more recent changes to the main code branch. To determine if the local code changes would conflict with any other changes made to the main code branch, main branch testing can be performed at block 412.

In some examples, as discussed above with respect to FIG. 3, the test conflict guard 112 may block main branch testing or provide a corresponding warning if the test conflict guard 112 detects issues with source code, including based on local changes made at block 404. In some examples, the test conflict guard 112 may permit local testing at block 406 despite such warnings, but not permit the merge request to be submitted at block 410 and/or for main branch testing to be executed at block 412, if such issues are present in the source code. Accordingly, in some examples, the main branch testing may proceed at block 412 after the test conflict guard 112 determines that such issues are not present or have been resolved, or based on a user instruction to override warnings associated with such issues.

In some examples, the merge request submitted at block 410 may initiate a code review process by which one or more other software developers review the local code changes associated with the software application 102 and/or the test cases 108 made at block 404. In these examples, if the other software developers do not approve local code changes by made by a software developer as part of the code review process, the software developer can return to make further changes to the source code locally via the computing device at block 404. However, if the other software developers do approve the local code changes as part of the code review process, the main branch testing can be performed at block 412.

The main branch testing performed at block 412 can include the operations of example process 300 shown and described with respect to FIG. 3. For instance, a centralized computing device can verify that the test cases 108 are independent. The centralized computing device can also build a new version of the software application based on the local code changes associated with the software application 102 and/or the test cases 108 made at block 404, as well as the most recent version of the main code branch. The centralized computing device can distribute independent test cases 108 among different test sets 110, execute the test sets 110 in parallel, and output an aggregated test result report based on test results corresponding to the different test sets 110.

At block 414, the system can determine whether the new version of the software application, built based on a combination of the local changes to the source code associated with the software application 102 and/or the test cases 108 and the most recent version of the source code in the main branch, passed all of the independent test cases 108 executed at block 412. If the aggregated test result report indicates that the new version of the software application did not pass all of the test cases 108 executed at block 412 (Block 414—No), the software developer can provide input that causes the computing device to make further local changes to the source code at block 404. The computing device can then cause local testing to be retried at block 406 and/or cause main branch testing to be retried at block 412. However, if the aggregated test result report indicates that the new version of the software application built during main branch testing at block 412 did pass all of the test cases 108 executed at block 412 (Block 414—Yes), the new version of the software application built during block 412 can be deployed in other environments at block 416. For example, at block 416, the new version of the software application can be deployed in other testing environments, in other development environments, and/or in production environments.

Process 400 can be used to determine whether a version of the software application passes test cases 108 at a local level and/or when merged into a main code branch. In both situations, by distributing independent test cases 108 among different test sets 110 and executing the test sets 110 in parallel, overall testing times can be reduced relative to executing the test cases 108 in sequence. Additionally, by using the test conflict guard 112 to verify that the test cases 108 executed at blocks 406 and 412 are independent, and do not include related and/or dependent test cases 108 that use the same database data, database errors and other testing errors that may occur if related and/or dependent test cases 108 are executed in parallel can be avoided. Process 400 can be performed by a computing device associated with a single developer and/or by a central server or other computing device associated with multiple developers, an example of which is shown and described below with respect to FIG. 5.

Figure 5:
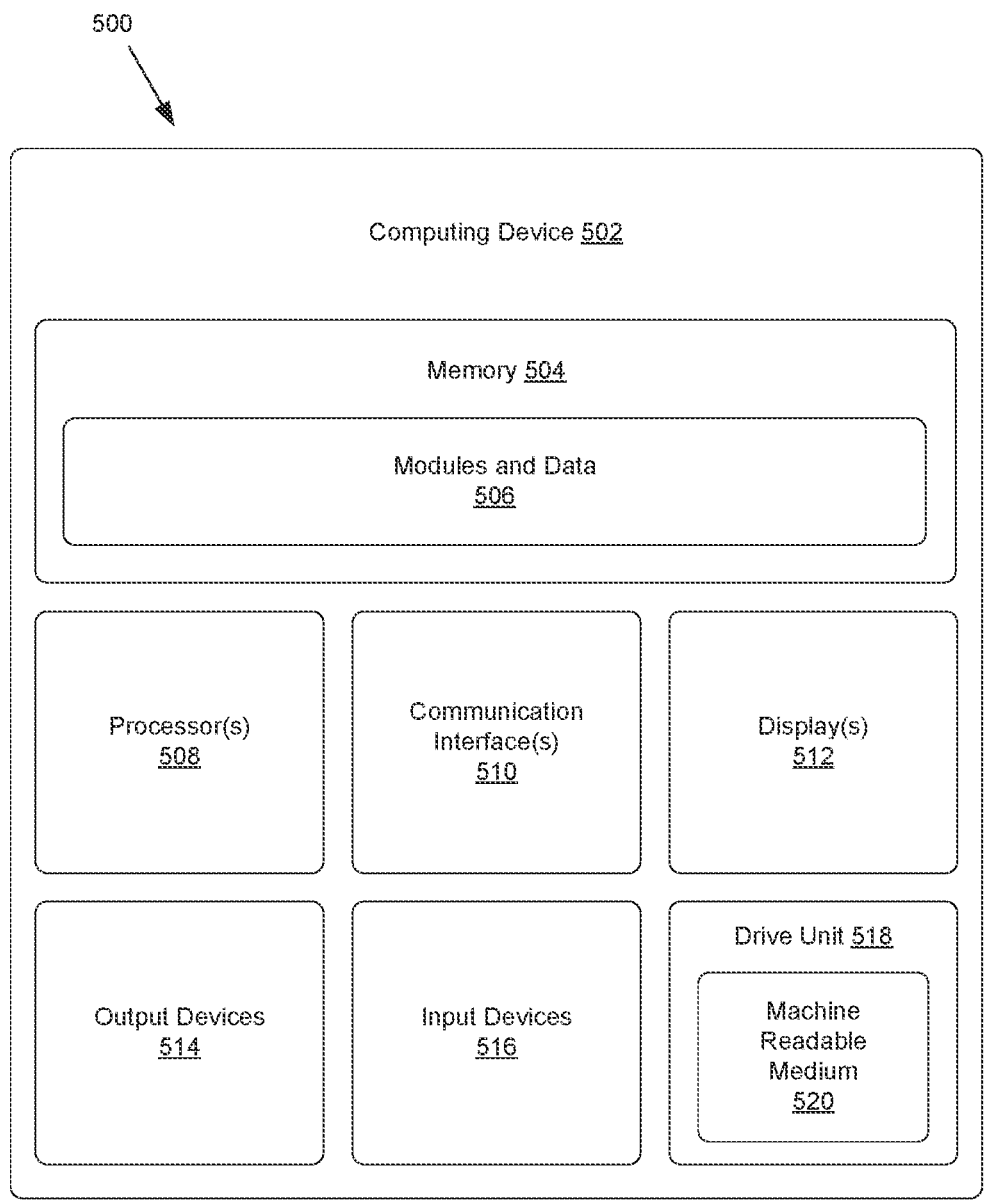
FIG. 5 shows an example system architecture for a computing device.

FIG. 5 shows an example system architecture 500 for a computing device 502 associated with the test manager 106, software application 102, test cases 108, test sets 110, database 104, test conflict guard 112, draft test cases 124, and/or programming tool 118 described herein. The computing device 502 can be a server, computer, or other type of computing device that executes the test conflict guard 112, the test manager 106, programming tool 118, and/or executes instances of the software application 102 and/or test sets 110 in parallel in association with the database 104.

The computing device 502 can include memory 504. In various examples, the memory 504 can include system memory, which may be volatile (such as RAM), non-volatile (such as ROM, flash memory, etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 502. Any such non-transitory computer-readable media may be part of the computing device 502.

The memory 504 can store modules and data 506. The modules and data 506 can include data associated with the test manager 106, the test conflict guard 112, the software application 102, the database 104, the test cases 108, draft test cases 124, the test sets 110, the programming tool 118, and/or other data. The modules and data 506 can also include any other modules and/or data that can be utilized by the computing device 502 to perform or enable performing any other actions. Such other modules and data can include a platform, operating system, and applications, and data utilized by the platform, operating system, and applications.

As discussed above, the test manager 106 may cause portions of the memory 504 to be allocated to different parallel threads. For instance, the test manager 106 may allocate portions of an overall amount of the memory 504 to different parallel threads, and cause different instances of the software application 102 to execute in the different parallel threads.

The computing device 502 can also have processor(s) 508, communication interfaces 510, displays 512, output devices 514, input devices 516, and/or a drive unit 518 including a machine readable medium 520.

In various examples, the processor(s) 508 can be a central processing unit (CPU), a graphics processing unit (GPU), both a CPU and a GPU, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing computer applications stored in the memory 504, which can be associated with common types of volatile (RAM) and/or nonvolatile (ROM) memory.

The communication interfaces 510 can include transceivers, modems, interfaces, antennas, telephone connections, and/or other components that can transmit and/or receive data over networks, telephone lines, or other connections.

The display 512 can be a liquid crystal display or any other type of display commonly used in computing devices. For example, a display 512 may be a touch-sensitive display screen, and can then also act as an input device or keypad, such as for providing a soft-key keyboard, navigation buttons, or any other type of input.

The output devices 514 can include any sort of output devices known in the art, such as a display 512, speakers, a vibrating mechanism, and/or a tactile feedback mechanism. Output devices 514 can also include ports for one or more peripheral devices, such as headphones, peripheral speakers, and/or a peripheral display.

The input devices 516 can include any sort of input devices known in the art. For example, input devices 516 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 520 can store one or more sets of instructions, such as software or firmware, that embodies any one or more of the methodologies or functions described herein. The instructions can also reside, completely or at least partially, within the memory 504, processor(s) 508, and/or communication interface(s) 510 during execution thereof by the computing device 502. The memory 504 and the processor(s) 508 also can constitute machine readable media 520.

The computing device 502 can execute testing of a software application more quickly and/or with fewer computing resources than other systems. By executing the test manager 106 to distribute test cases 108 among different test sets 110 that are executed in parallel, the set of test cases 108 can be executed more quickly than the test cases 108 could be executed in sequence. As a non-limiting example, although the computing device 502 might take two hours to execute a full set of test cases 108 in sequence, it may take less than an hour to execute the test cases 108 in parallel. Accordingly, developers can thus be notified whether their code changes pass the test cases 108 more quickly, and allow code changes that have passed the test cases 108 to be merged into a main code branch more quickly.

Similarly, executing test cases 108 in parallel can also reduce overall usage of computing resources on the computing device 502 when multiple new builds of a software application are tested. As a non-limiting example, although the computing device 502 might take two hours to execute a full set of test cases in sequence, and thus take up to 7200 minutes to test sixty different builds in a day, executing the test cases 108 in parallel may reduce testing times per build down to 30 minutes or less. Accordingly, executing test cases 108 in different test sets 110 in parallel may allow the computing device 502 to reduce the time it takes to test all sixty builds down to under 1800 minutes per day.

Moreover, because the test conflict guard 112 can prevent related or dependent test cases 108 from being distributed among different test sets 110 executed in parallel, database errors and other testing errors that could otherwise occur when related or dependent test cases 108 are executed in different parallel threads can be avoided. Accordingly, by using the test conflict guard 112 to cause the test manager 106 to distribute independent test cases 108 among different test sets 110 to be executed in parallel, the computing device 502 can avoid table-locking errors, record-locking errors, missing data errors, or other database and testing errors that might otherwise cause related or dependent test cases 108 to fail if the related or dependent test cases 108 were executed in different parallel threads.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
   identifying, by one or more processors of a computing device, a plurality of test cases associated with a software application;
   determining, by the one or more processors, at a first time, and by analyzing source code associated with the plurality of test cases without executing the plurality of test cases, that the plurality of test cases includes at least two related test cases configured to use common data in a database;
   blocking, by the one or more processors, initiation of testing comprising execution of the plurality of test cases, in response to determining at the first time that the plurality of test cases includes the at least two related test cases;
   determining, by the one or more processors, at a second time, and by re-analyzing the source code, without executing the plurality of test cases, in response to at least one change to the source code, that the plurality of test cases:
      includes independent test cases configured to use distinct data in the database; and
      no longer includes the at least two related test cases;
   unblocking, by the one or more processors, the initiation of the testing, wherein the unblocking permits the execution of the plurality of test cases in response to determining that the plurality of test cases includes the independent test cases and no longer includes the at least two related test cases; and
   initiating, by the one or more processors, and at a third time following the unblocking, the testing by:

distributing individual test cases, of the plurality of test cases among a plurality of test sets; and executing the plurality of test sets in parallel.

2. The computer-implemented method of claim 1, wherein determining that the plurality of test cases includes the at least two related test cases comprises:

identifying, by the one or more processors, first source code, in the source code, that is associated with a first test case of the plurality of test cases;

determining, by the one or more processors, and by analyzing the first source code, that the first source code references database data comprising one or more of:

a table in the database, a record in the database, or a record attribute in the database;

identifying, by the one or more processors, second source code in the source code, that is associated with a second test case of the plurality of test cases; and determining, by the one or more processors, and by analyzing the second source code, that the second source code references the database data referenced by the first source code.

3. The computer-implemented method of claim 1, wherein the plurality of test cases comprises at least one draft test case generated via a programming tool that is configured to at least one of display or edit the source code.

4. The computer-implemented method of claim 3, wherein blocking the initiation of the testing comprises causing, by the one or more processors, the programming tool to display a warning message identifying at least one portion of the source code associated with the at least two related test cases.

5. The computer-implemented method of claim 3, wherein the plurality of test cases further comprises a set of pre-existing test cases.

6. The computer-implemented method of claim 1, wherein:

the plurality of test cases comprises a set of classes;

individual classes of the set of classes comprise one or more methods; and the one or more processors initiate the testing by distributing the one or more methods among the plurality of test sets at one or more of: a class level, or a method level.

7. The computer-implemented method of claim 1, further comprising:

collecting, by the one or more processors, a plurality of test results associated with the plurality of test sets; and aggregating, by the one or more processors, the plurality of test results.

8. The computer-implemented method of claim 1, further comprising:

generating, by the one or more processors, a local build of the software application based on one or more code changes submitted locally, wherein identifying the plurality of test cases, determining that the plurality of test cases includes the at least two related test cases, blocking the initiation of the testing, determining that the plurality of test cases includes the independent test cases and no longer includes the at least two related test cases, unblocking the initiation of the testing, and initiating the testing are performed as part of a test process for the local build.

9. The computer-implemented method of claim 1, further comprising:

generating, by the one or more processors, a merge build of the software application based on one or more code changes submitted locally and based on a master code branch associated with the software application;

wherein identifying the plurality of test cases, determining that the plurality of test cases includes the at least two related test cases, blocking the initiation of the testing, determining that the plurality of test cases includes the independent test cases and no longer includes the at least two related test cases, unblocking the initiation of the testing, and initiating the testing are performed as part of a test process for the merge build.

10. The computer-implemented method of claim 1, further comprising:

detecting, by the one or more processors, and based on analyzing the source code at the first time, at least one instance in the plurality of test cases of an object being instantiated in memory more than once; and causing, by the one or more processors, a programming tool to display a warning message indicating that the object is configured to be instantiated in memory more than once.

11. One or more computing devices, comprising:

one or more processors;

memory storing computer-executable instructions that, when executed by the one or more processors, cause the one or more computing devices to perform operations comprising:

identifying a plurality of test cases associated with a software application;

executing a test conflict guard configured to:

analyze source code associated with the plurality of test cases, without executing the plurality of test cases;

block initiation of testing comprising execution of the plurality of test cases in response to a first determination, based on a first analysis of the source code by the test conflict guard, that at least some of the plurality of test cases are related test cases configured to use common data in a database; and unblock the initiation of the testing in response to a second determination, based on a second analysis of the source code by the test conflict guard, that the plurality of test cases includes independent test cases configured to use distinct data in the database and no longer includes the related test cases, wherein unblocking of the initiation of the testing permits the execution of the plurality of test cases; and executing a test manager configured to, based on the unblocking of the initiation of the testing by test conflict guard, initiate the testing by:

distributing individual test cases, of the plurality of test cases, among a plurality of test sets; and causing the execution of the plurality of test sets in parallel.

12. The one or more computing devices of claim 11, wherein the test conflict guard is a component of the test manager.

13. The one or more computing devices of claim 11, wherein:

the test conflict guard is a component of a programming tool configured to at least one of display or edit the source code; and the test conflict guard is configured to evaluate at least one draft test case, generated via the programming tool, as part of the plurality of test cases.

14. The one or more computing devices of claim 11, wherein the test conflict guard is configured to evaluate at least one draft test case, received from an external programming tool, as part of the plurality of test cases.

15. The one or more computing devices of claim 11, wherein the test conflict guard is configured to make the first determination by:
identifying first source code, in the source code, associated with a first test case of the plurality of test cases;
determining, by analyzing the first source code, that the first source code references database data, the database data comprising one or more of:
a table in the database;
a record in the database; or
a record attribute in the database;
identifying second source code, in the source code, associated with a second test case of the plurality of test cases; and
determining, by analyzing the second source code, that the second source code references the database data referenced by the first source code.

16. The one or more computing devices of claim 11, wherein:
the plurality of test cases comprises a set of classes;
individual classes of the set of classes comprise one or more methods; and
the test manager is configured to initiate the testing by distributing the one or more methods among the plurality of test sets at one or more of: a class level, or a method level.

17. One or more non-transitory computer-readable media storing computer-executable instructions that, when executed by one or more processors, cause the one or more processors to perform operations comprising:
identifying a plurality of test cases associated with a software application, wherein the plurality of test cases comprises at least one draft test case generated via a programming tool that is configured to at least one of:
display source code associated with the plurality of test cases; or
edit the source code;
determining, based on a first analysis of the source code and without executing the plurality of test cases, that the plurality of test cases includes at least two related test cases configured to use common data in a database;
causing, based on the first analysis, the programming tool to:
display a warning message identifying at least one portion of the source code associated with the at least two related test cases; and
block initiation of testing comprising execution of the plurality of test cases;
determining, based on a second analysis of the source code, without executing the plurality of test cases, performed in response to at least one change to the plurality of test cases received via the programming tool in response to the warning message, that the plurality of test cases:
includes independent test cases configured to use distinct data in the database; and
no longer includes the at least two related test cases;
unblocking, based on the second analysis, the initiation of the testing, wherein the unblocking permits the execution of the execution of the test cases; and
initiating the testing, based on the unblocking, by:
distributing individual test cases, of the plurality of test cases, among a plurality of test sets; and
executing the plurality of test sets in parallel.

18. The one or more non-transitory computer-readable media of claim 17, wherein determining that the plurality of test cases includes the at least two related test cases comprises:
identifying first source code, in the source code, associated with a first test case of the plurality of test cases;
determining, based on the first source code, that the first source code references database data comprising one or more of:
a table in the database;
a record in the database; or
a record attribute in the database;
identifying second source code, in the source code, associated with a second test case of the plurality of test cases; and
determining, based on the second source code, that the second source code references the database data referenced by the first source code.

19. The one or more non-transitory computer-readable media of claim 17, wherein:
the plurality of test cases comprises a set of classes;
individual classes of the set of classes comprise one or more methods; and
distributing the individual test cases of the plurality of test cases among the plurality of test sets comprises distributing the one or more methods among the plurality of test sets at one or more of: a class level, or a method level.

20. The one or more computing devices of claim 11, wherein blocking of the initiation of the testing by the test conflict guard prevents the test manager from initiating the testing by:
distributing the individual test cases among the plurality of test sets; and
causing the execution of the plurality of test sets in parallel.

* * * * *